Patented Mar. 22, 1938

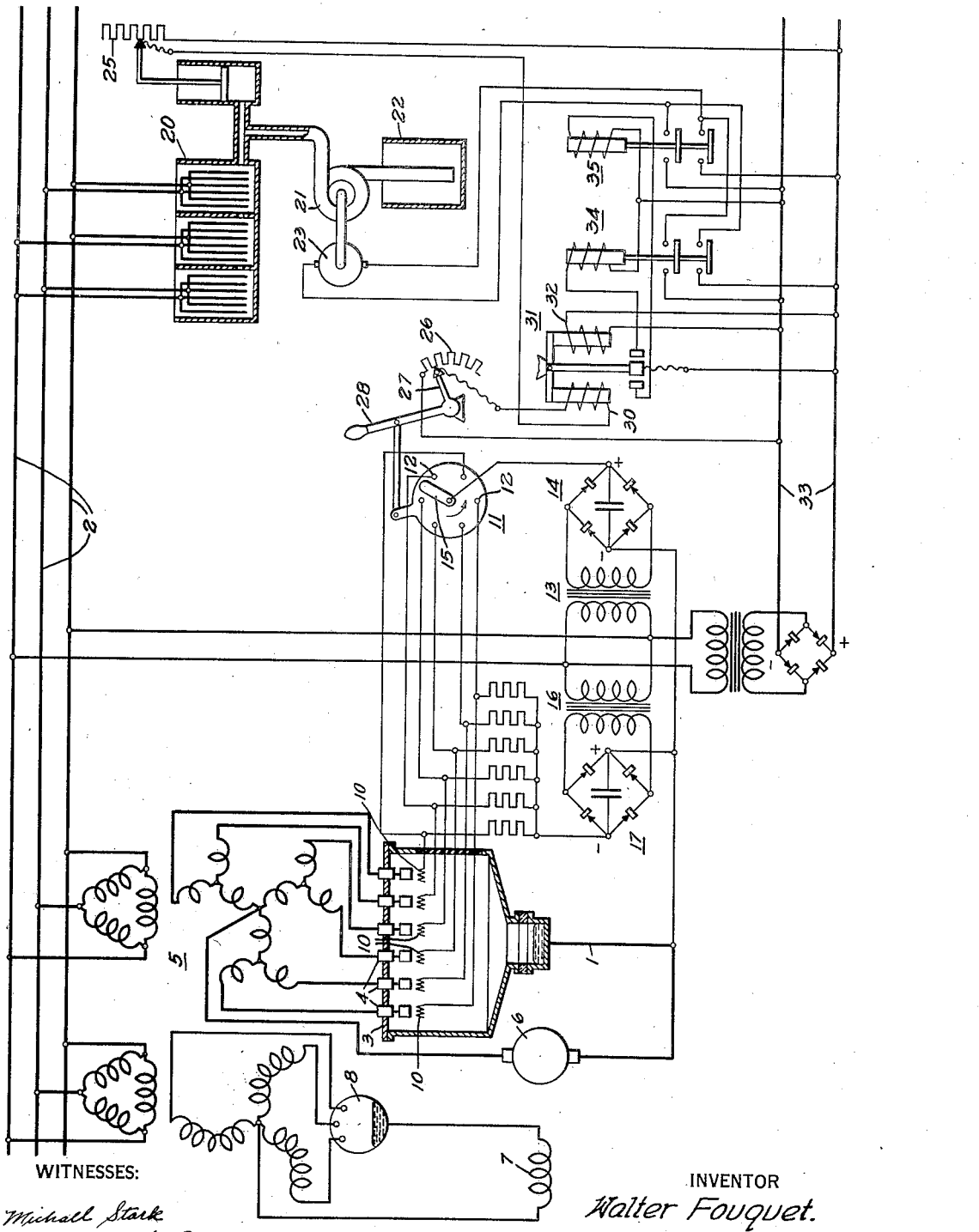

2,112,083

UNITED STATES PATENT OFFICE 2,112,083

ELECTRIC CURRENT CONVERTING SYSTEM

Walter Fouquet, Zeuthen (Mark), Germany, assignor to Westinghouse Electric & Manufacturing Company, East Pittsburgh, Pa., a corporation of Pennsylvania Application April 2, 1937, Serial No. 134,543
In Germany April 8, 1936

5 Claims. (Cl. 175—363)

My invention relates to a vapor electric current conversion system and particularly to means for controlling the power factor drawn by controllable mercury arc rectifiers.

In the application of conversion systems it is frequently desirable to control the output voltage of the conversion system. In valve type converters, such as mercury arc rectifiers, this is commonly accomplished by applying a control electrode to each of the valves or arc paths of the converter, and feeding to the control electrodes a suitable control potential for varying the firing angle in the converter; i. e., the time of application of the control voltage is advanced or retarded with respect to the voltage wave applied to the valve in order to pass more or less of the applied voltage wave. This method of control has, however, been objectionable in that the power factor on the supply line becomes lagging as the output voltage is decreased by retarding the firing angle.

When the load voltage at the reduced load potential is of a relatively low value or when the load current is proportional to the load voltage, lagging power factor on the supply circuit may be conveniently adjusted by means of suitable fixed loads requiring a leading current. However, in the event that relatively large currents must be drawn at the low voltage portion of the load characteristic such as when starting motors under load at low voltage or when a variable load is taken at low voltage, a fixed leading current is not sufficient to prevent serious fluctuations of the power factor on the supply circuit.

According to my invention, this fluctuating power factor is corrected by means of a variable leading current load, and by so coupling together the regulating equipment of the converter and the variable load that the leading current taken by the variable load is increased in proportion to the decrease in the output potential of the rectifier or, if desired, made directly dependent upon the power factor taken by the converter. While any suitable leading current load may be utilized, I prefer to use capacity apparatus, such as synchronous motors having variable fields or variable capacitors of any suitable type. Among these capacitors may be those having a plurality of elements which may be successively connected, capacitors having liquid dielectrics, the level of which may be changed or a gaseous dielectric, the pressure of which may be changed.

Various other advantages of my invention will be apparent from the following detailed description taken in conjunction with the accompanying drawing, in which the single figure is a schematic illustration of a conversion system utilizing my invention.

In the illustrated embodiment of my invention, a direct current load circuit 1 is supplied from an alternating current circuit 2 by means of a controllable valve type rectifier 3, the valves 4 of which are connected to the alternating current circuit 2 by means of a suitable transformer 5. In the illustrative embodiment, the load circuit 1 comprises one or more direct current motors 6 which may be required to start loads at reduced voltage. For purposes of convenience, the field winding 7 of the motor 6 is provided with a substantially constant current by means of a suitable auxiliary converter 8. In order to control the potential supplied to the load circuit 1 by the converter 3, each of the valves 4 of the converter is provided with a suitable control electrode 10, supplied with control potential by means of a suitable impulse device herein illustrated as a rotating contactor 11, the contact elements 12 of which may be physically shifted to advance or retard the application of the positive control potential to the control electrodes 10.

While any suitable source of control potential may be utilized, I have illustrated a control transformer 13 supplied from the alternating current circuit 2, the output potential of which is rectified by a suitable full-wave rectifier 14 and supplied to the rotating element 15 of the impulsing device 11. In order to maintain the valves 4 inoperative except at the time of application of the control potential, a suitable negative bias is constantly applied to all of the control electrodes 10. Preferably, this negative bias is likewise obtained from a biasing transformer 16 connected to the alternating current circuit 2 and rectifier by any suitable means, such as the full-wave rectifier 17. A suitable consumer of leading current is also connected to the alternating current circuit. As illustrated, this leading current consumer is a capacitor 20 having a liquid dielectric, the level of which may be varied to control the capacitance thereof. While any suitable means may be utilized for varying the liquid level, I prefer to use a pump 21 capable of operating to transfer a liquid in either direction and to transfer the liquid between the capacitor 20 and a suitable storage reservoir 22 in dependence on the leading current requirements of the system. A suitable reversible motor 23 is provided for operating the aforementioned pump 21. The control circuit for this reversible motor 23 comprises a control circuit having two serially connected resistance elements 25—26, the value of one of which, 25, is controlled by the level of the dielectric in the capacitor 20 and the other of which, 26, is controlled by the position of the contact elements 12 of the impulsing device 11 herein illustrated as being operated by a contact element 27 carried by the operating mechanism 28 for the contact elements 12. The current flowing through these series resistors 25—26 is supplied to one winding 30 of a balance relay 31, the other winding 32 of which is supplied with constant current from any suitable source herein illustrated as the control bus 33 supplying energy to the series resistors 25—26 and motor 23. When the current through the series resistors 25—26 is such as to substantially balance the constant current in the balance relay 31, that relay will remain open and the reversible motor 23 will be inoperative. However, upon change of either the liquid level in the capacitor 20 or the position of the impulsing device 11, the current in the series resistors 25—26 will be changed and the current either increased or decreased through the controlled coil 30 of the balance relay 31. If this current is increased, the balance relay 31 will operate in one direction to control an operating relay 34 to supply current to the reversible motor 23 in such a manner as to pump more liquid into the capacitor 20 and thus increase the capacity thereof. On the other hand, if the current is decreased, the balance relay 31 will operate in the reverse direction to supply current to another relay 35 reversing the direction of rotation of the motor 23 and reducing the level of the dielectric to decrease the leading current taken from the alternating current circuit 2.

While for purposes of illustration, I have shown and described a specific embodiment of my invention, it will be apparent to those skilled in the art that many changes and modifications can be made therein without departing from the true spirit of my invention or the scope of the appended claims.

I claim as my invention:

1. An electrical conversion system comprising an alternating current supply circuit, a variable voltage load circuit, a grid controlled converter for supplying current to said load circuit from said supply circuit, a control system for advancing or retarding the firing angle of said converter, a consumer of leading current connected to said supply circuit and means interlocked with said control system for increasing the current in said consumer of leading current with retardation of the firing angle in said converter.

2. An electrical conversion system comprising an alternating current supply circuit, a direct current consuming circuit, a vapor-electric converter for transferring energy from said supply circuit to said consuming circuit, control electrodes in said converter, a source of control potential for said electrodes, control means for applying said control potential to said control electrodes, said control means being adjustable to vary the output voltage of said converter, current consuming means connected to said supply circuit for drawing a leading current therefrom, and means responsive to the position of said control means for varying the current drawn by said current varying means.

3. An electric current conversion system comprising an alternating current supply circuit, a direct current load circuit, a valve-type converter for transferring energy between said circuits, control electrodes in said converter, a source of control potential for said control electrodes, a rotating contactor for periodically applying potential from said source to said control electrodes, means for advancing or retarding the time of application of said control potential, a variable capacitor connected to said supply circuit, and means for increasing the capacity of said capacitor upon retardation of the time of application of said control potential.

4. An electric current conversion system comprising an alternating current supply circuit, a direct current load circuit, a valve-type converter for transferring energy between said circuits, control electrodes in said converter, a source of control potential for said control electrodes, a rotating contactor for periodically applying potential from said source to said control electrodes, means for advancing or retarding the time of application of said control potential, a liquid dielectric capacitor connected to said supply circuit and means controlled by the position of said contactor for varying the level of the dielectric in said capacitor.

5. An electric current conversion system comprising an alternating current supply circuit, a load circuit, a muti-valve converter for transferring energy between said circuits, control electrodes associated with the valves of said converter, a source of control potential for said control electrodes, a contact apparatus for successively applying impulses from said source to said control electrode, means for shifting said contactor for varying the voltage applied to said load circuit, a liquid dielectric capacitor connected to said supply circuit, a pump for controlling the level of the dielectric in said capacitor, a reversible motor for operating said pump, and a control circuit actuated by the position of said contactor and the level of the dielectric in said capacitor for controlling the operation of said motor.

WALTER FOUQUET.